UNITED STATES PATENT OFFICE.

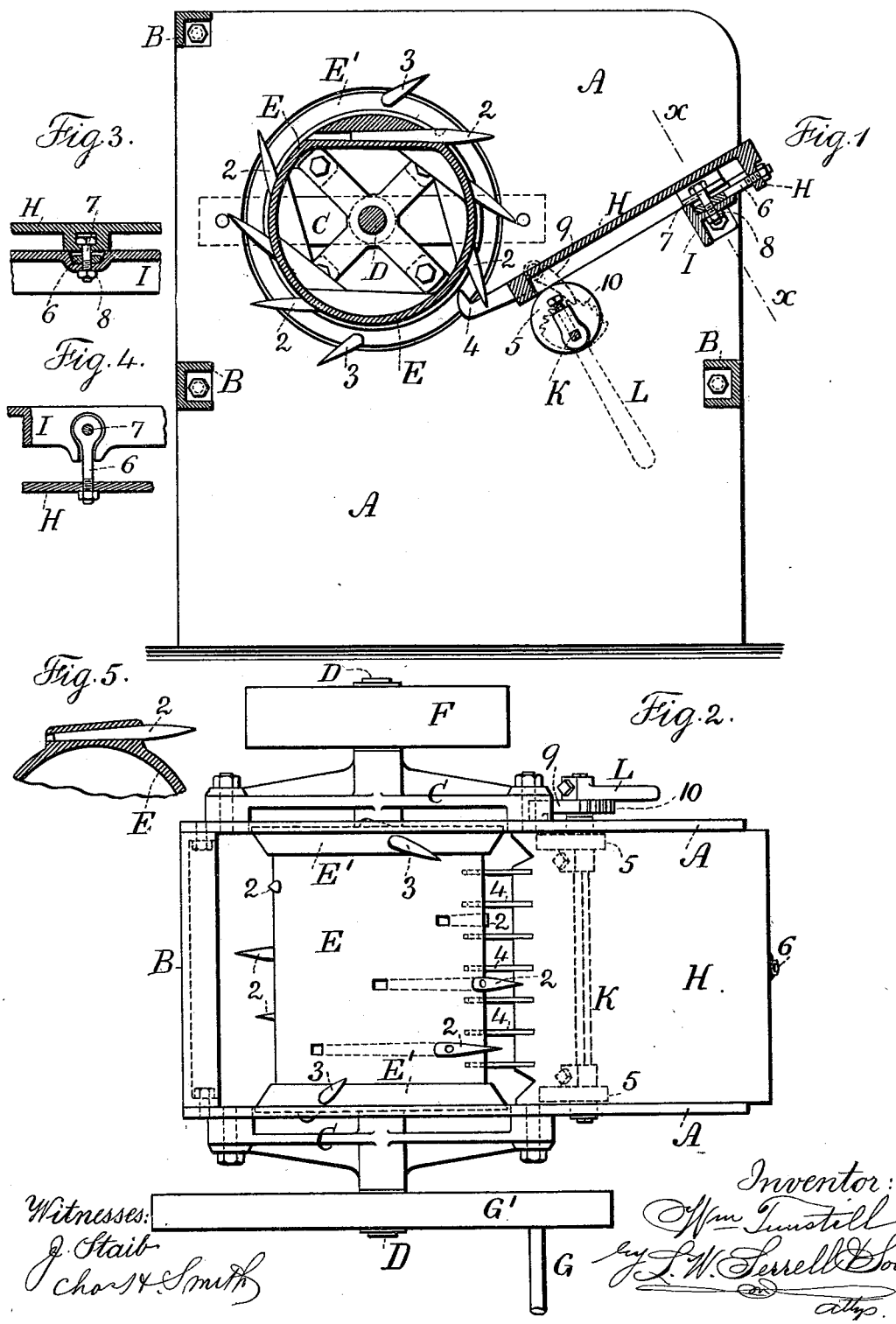

WILLIAM TUNSTILL, OF NEW YORK, N. Y.

ROTARY ICE-BREAKER.

SPECIFICATION forming part of Letters Patent No. 626,042, dated May 30, 1899.

Application filed May 14, 1897. Serial No. 636,517. (No model.)

*To all whom it may concern:*

Be it known that I, WILLIAM TUNSTILL, a citizen of the United States, residing at New York, (Brooklyn,) in the county of Kings and State of New York, have invented an Improvement in Rotary Ice-Breakers, of which the following is a specification.

This machine is especially intended for cracking and breaking ice adapted to ice-cream freezers and for refrigerating purposes. In the machines heretofore constructed difficulty has been experienced in removing broken teeth and replacing them by others, because the teeth are liable to become rusty and any screws made use of rust so that they cannot be turned, and in cases where the teeth are not secured by screws they are liable to work loose and drop out.

In the present machine a cylinder is made use of having mortises that taper slightly and pass into the cylinder at one place and out at the surface of the cylinder at another place, so that the shanks of the teeth occupy the positions of chords to the cylinder, and the slight taper to the mortise and to the teeth insures their stability when driven into position, and any broken or injured tooth can be easily removed by a punch driven into the back end of the mortise and against the tooth.
The teeth in my improvement fasten and tighten themselves in use. I also provide diagonal teeth in the beveled end portions of the cylinder that act to slice off and break up the corners of the cake of ice, and the ice is allowed to slide down an incline having claws at the lower end closely adjacent to the surface of the cylinder and between which claws the breaking-teeth of the cylinder pass, and this incline is supported and adjusted as hereinafter described.

In the drawings, Figure 1 is a vertical section transversely of the breaking-cylinder. Fig. 2 is a plan view showing the incline and the claws upon the same; and Fig. 3 is a cross-section at the line *x x*, Fig. 1. Fig. 4 is a plan of part of the cross-bar, showing the adjusting-screw; and Fig. 5 is a section showing a modification.

The frames A are of suitable size, and they are supported at the proper distances apart by the cross-bearers B, and there are, advantageously, openings through the side frames A adjacent to the ends of the cylinders, and bearers C, bolted upon the frames and having boxes supporting the shaft D of the breaking-cylinder E, and this cylinder and shaft may be rotated by power applied to the pulley F or by hand applied to the crank-handle G on the fly-wheel G'.

The teeth 2 are of suitable size and advantageously made with sharp points and with shanks or bodies that taper slightly, and in the cylinder E mortises are cast corresponding in shape to the shanks of the teeth 2— that is to say, such mortises taper slightly, so as to be adapted to receive and hold the teeth 2, and these mortises occupy the positions of chords to the cylinder, and they pass in at one portion of the cylindrical surface and out at another portion and are in a plane perpendicular to the axis of rotation, or nearly so. These teeth, however, do not stand in a straight row parallel with the axis of the cylinder, but they are placed one behind the other, so as to act in succession upon the ice, thereby dividing up the power necessary to revolve the breaker-cylinder, and the number of teeth introduced in the cylinder and their distances apart will vary according to the size required for the pieces of ice as cracked or broken, and also according to the size of the cake of ice that is to be operated upon.

The teeth do not stand as tangents to the cylinder nor upon the radial line, as in breaking-cylinders heretofore constructed, but they stand at an obtuse angle to the radial line intersecting the junction of the tooth with the surface of the cylinder, so that each tooth has a hooking action on the cake of ice to pull it toward the cylinder, and at the same time the resistance of the ice tends to drive the teeth firmly into the cylinder and the shanks of the teeth tapering in all directions tighten, so as to hold firmly and to loosen up uniformly as driven out.

I find it advantageous to make use of bevel flanges or heads E' to the cylinder E, and these may be either cast with the cylinder or made separate and bolted on, and the teeth 3 in these heads are generally similar to the teeth 2, but instead of occupying the position of a plane at right angles to the axis of the cylinder such teeth are inclined inward, so as to act upon the corners of the cake of ice, the teeth on one head standing in the opposite direction to the teeth on the other head, and these teeth are received into tapering mortises through the conical heads and the mortises are open at the bottom or inner ends, so that the teeth can be driven out for repairs or for inserting new teeth.

The incline H is between the frames A, and is at such an angle that a block of ice set upon the incline will slide down toward the cylinder E, and thereby feed progressively as the ice next the cylinder is chipped off by the action of the teeth, and at the edge of the incline next to the cylinder E there are claws 4, that project toward the cylinder and turn upward at their ends, so as to catch and hold the pieces of ice until they are sufficiently small to pass through between the claws, and the openings between the claws are in the proper positions for the teeth to pass freely through such openings.

The outer and upper end of the incline H is supported on a cross-bar I, and the lower portion of the incline rests upon the eccentrics 5, that are upon the cross-shaft K, so that by turning this cross-shaft K the eccentrics will either raise or lower the incline and claws and thereby regulate their proximity to the surface of the cylinder, and upon the end of the cross-shaft K is a lever L for turning such shaft, and any suitable means may be employed for holding the lever and shaft in position—such, for instance, as a clamping-screw or a pin passing into one of a series of holes in the side frame. I have, however, shown the pawl 9 engaging the ratchet 10.

It is important to vary the proximity of the claws to the surface of the cylinder; and with this object in view there is a bolt 6, connected at one end to the cross-bar I and passing through a flange upon the under side of the incline H, and a nut upon the bolt 6 is employed for regulating the position of the incline and holding the same, and I also find it advantageous to make use of a clamping-bolt 7, the head of which is received between shouldered flanges on the under side of the incline H, and this bolt passes through the eye of the bolt 6 and also through the cross-bar I, and there is a nut 8 on the lower end, so that by loosening this nut 8 the bolt 6 can be used for moving the incline toward or from the breaking-cylinder, and then by tightening the nut 8 the incline is clamped firmly to the cross-bar I.

The teeth with tapering shanks will be self-tightening by use whether the surface of the cylinder is smooth, as seen in Figs. 1 and 2, or whether there are projections on the surface of the cylinder through which the tapering shanks of the teeth pass, as seen in Fig. 5.

I claim as my invention—

1. As a new article of manufacture, a rotary ice-breaker having through it tapering holes and removable teeth, having points and tapering shanks, fitting the tapering holes, so that the teeth are tightened by contact with the ice but can be driven out for sharpening or to be replaced, substantially as set forth.

2. The cylinder having tapering mortises through it and tapering teeth driven into the mortises, in combination with the flanged heads having mortises through them and removable teeth with tapering shanks set at an inclination and adapted to act upon the corners of the cake of ice, substantially as set forth.

3. In an ice-breaker, the combination with the cylinder having teeth, of an incline with fingers at the lower end, down which the ice will slide, an eccentric for adjusting the proximity of the incline to the cylinder, a cross-bar, bolt and clamp for adjusting and holding the incline, substantially as set forth.

Signed by me this 11th day of May, A. D. 1897.

W. TUNSTILL.

Witnesses:
 HAROLD SERRELL,
 S. T. HAVILAND.